United States Patent Office 3,433,718
Patented Mar. 18, 1969

3,433,718
CONCENTRATION OF NITRIC ACID USING LITHIUM NITRATE
Anthony W. Yodis, Whippany, N.J., assignor to Allied Chemical Corporation, New York, N.Y., a corporation of New York
Filed Feb. 15, 1967, Ser. No. 616,386
U.S. Cl. 203—13                               6 Claims
Int. Cl. C01b 21/46; B01d 3/34

ABSTRACT OF THE DISCLOSURE

This application relates to a process for the concentration by distillation of dilute nitric acid wherein molten lithium nitrate is added as a dehydrating agent to aqueous dilute nitric acid which has previously been concentrated in order to avoid the problem of azeotrope formation. Concentrated $HNO_3$ is taken off as an overhead in the distillation while $HNO_3$—$H_2O$—$LiNO_3$ bottoms is flashed for recovery of the $HNO_2$ hydrate as vapor recycle to feed.

BACKGROUND OF THE INVENTION

Field of the invention

This application relates to processes for concentration by distillation of aqueous nitric acid solutions using inorganic compounds as dehydrating agents to shift the liquid-vapor equilibrium so as to allow concentration of the aqueous nitric acid solutions above the 68% by weight $HNO_3$-32% water azeotrope with nitric acid and water normally form.

It is an object of this invention to concentrate aqueous nitric acid solutions to acid concentrations above the azeotrope by using lithium nitrate as a dehydrating agent to shift the liquid vapor equilibrium.

It is another object of this invention to employ the lithium nitrate dehydrating agent in initially molten unhydrated form.

It is a further object of this invention to recover the lithium nitrate dehydrating agent after it has been used in distillation by adding the weak aqueous nitric acid solution in which it is dissolved to a pool of molten lithium nitrate.

Other and further objects of this invention will be apparent to those skilled in the art upon a reading of the following specification and claims.

DESCRIPTION OF THE PRIOR ART

Nitric acid is a very widely used acid. Many industrial applications requiring the use of this acid require that it be used in concentrated form. However, production of such concentrated nitric acid presents problems because nitric acid and water form an azeotrope at about 68% by weight nitric acid, so that nitric acid cannot be concentrated beyond this point by fractional distillation.

It is known in the art to concentrate nitric acid acid by adding magnesium nitrate to the weak aqueous acid and distilling the resulting solution so as to obtain concentrated nitric acid. In such a process the magnesium nitrate serves as a dehydrating agent by forming magnesium nitrate hydrate and consequently shifting the liquid-vapor equilibrium of the solution so as to avoid the problem of azeotrope formation. However, the use of magnesium nitrate for this purpose has several disadvantages.

For obvious reasons, relating to the ease of material handling, it is highly desirable to handle the magnesium nitrate in liquid form. Because of its melting point the only practical way to accomplish this is to use the magnesium nitrate in aqueous solution. Since the dehydrating effect of magnesium nitrate is based on the formation of magnesium nitrate hydrate, the use of magnesium nitrate in aqueous solution as a dehydrating agent for nitric acid has the disadvantage that by putting the magnesium nitrate into solution before introducing it into the aqueous dilute nitric acid a substantial part of the capacity of the magnesium nitrate to dehydrate the acid has already been used up before it can act to dehydrate the nitric acid. In other words the water of the solution has partly hydrated the magnesium nitrate before the magnesium nitrate has a chance to act upon the aqueous dilute nitric acid. For this reason, in order to dehydrate aqueous dilute nitric acid, the magnesium nitrate solution must be utilized with a high rate of recycle in order to achieve substantial dehydration and resultant concentration of the nitric acid. Also, due to the hydrolysis characteristics of magnesium nitrate, there is a loss of nitric acid due to hydrolysis when magnesium nitrate is used as a dehydrating agent.

It is also known in the art to concentrate nitric acid by using sulfuric acid to dehydrate the aqueous nitric acid and yield strong nitric acid vapors which are condensed to strong nitric acid. However, such a concentration process has the disadvantage that large amounts of sulfuric acid must be reconcentrated for reuse and such reconcentration is an expensive process. Also, the sulfuric acid-nitrate acid-water mixture is very corrosive, requiring special construtcion materials suitably resistant to the corrosive nature of the mixture, and there is inefficiency in the process in that high heat losses occur when the spent or weak sulfuric acid leaves the nitric acid concentrator and when the hot reconcentrated sulfuric acid leaves the sulfuric acid concentrator.

Because of the manner in which magnesium nitrate functions as a dehydrating agent in nitric acid concentration processes, one would not expect that lithium nitrate could be used for dehydration since it loses its water of hydration at the low temperature of about 61° C. For this reason, no practical, commercial process has been devised wherein lithium nitrate can be used advantageously.

I have now discovered such a process.

SUMMARY

My new process involves the steps of:
(1) Concentrating weak aqueous nitric acid solution, for example by conventional rectification, until it contains more than about 35% by weight nitric acid, preferably at least about 50% and desirably at least about 65% by weight nitric acid,
(2) Dissolving molten lithium nitrate in the resulting nitric acid solution as a dehydrating agent,
(3) Distilling the aqueous lithium nitrate-nitric acid solution to obtain vapors more concentrated than 68% by weight nitric acid and rectifying these vapors to obtain strong nitric acid as distillate and weak aqueous nitric acid containing dissolved lithium nitrate as residue, and
(4) Flash evaporating the weak aqueous nitric acid-lithium nitrate residue solution on a pool of molten lithium nitrate to flash off weak aqueous nitric acid and recover lithium nitrate.

Two additional steps are optional but preferable. They are:
(5) Recycling the flashed off weak aqueous nitric acid for use as weak aqueous nitric acid feed for concentration step 1 above, and
(6) Recycling at least a portion of the lithium nitrate from the pool for addition to the nitric acid solution in step 2 above.

My novel process has the advantage that the lithium nitrate, due to its relatively low melting point, can be handled as a molten liquid and need not be dissolved in water before use, thus allowing use of a relatively low recycle rate to produce commercially significant quantities of concentrated nitric acid. Also, no nitric acid is lost due to hydrolysis.

DETAILED DESCRIPTION

My novel process will be further described by reference to the above-mentioned drawings.

Figure 1:
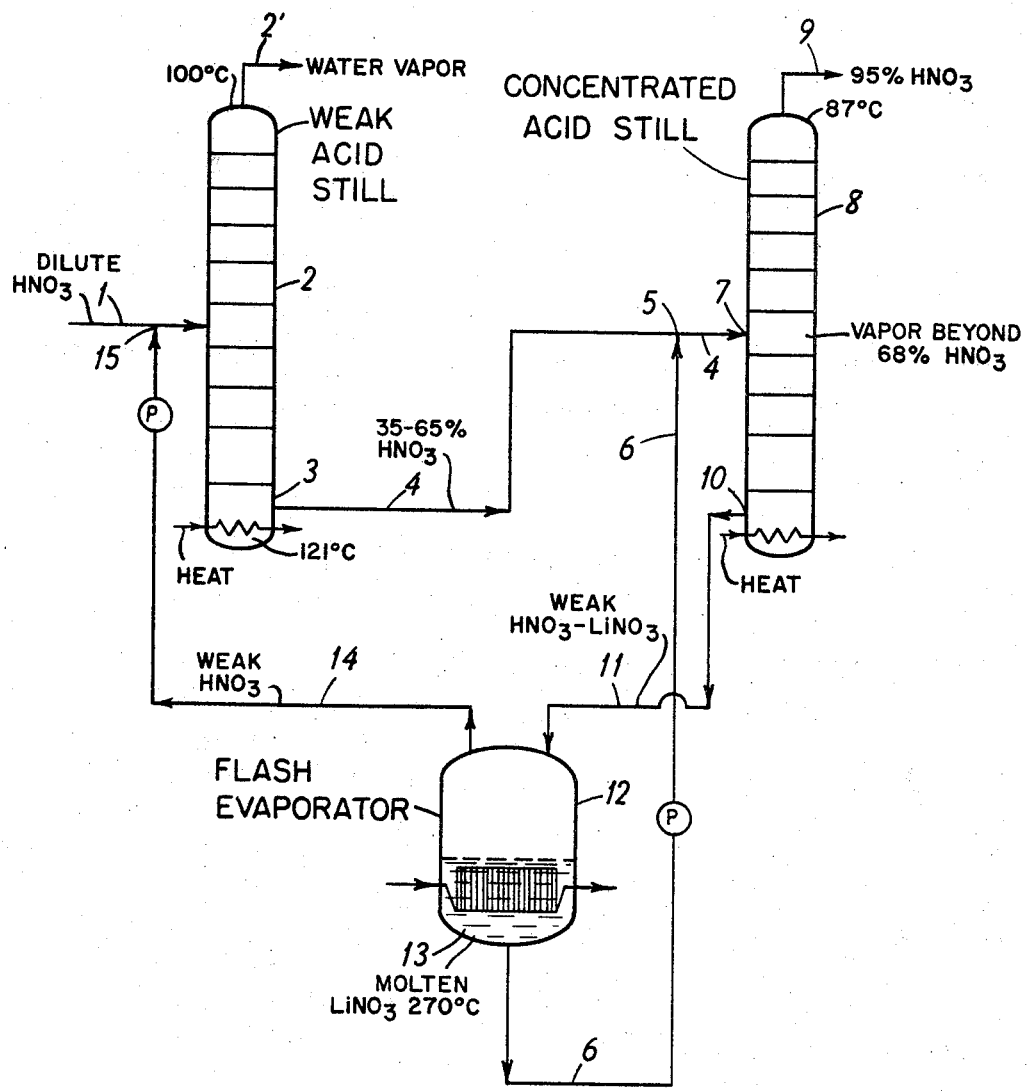
FIGURE 1 of the drawings is a schematic view of my novel process.

Referring to FIGURE 1, reference numeral 1 indicates a feed line through which a dilute aqueous nitric acid feed solution is fed to a weak acid still 2. In weak acid still 2 the feed acid is concentrated by distillation until the concentration of nitric acid in water reaches the point at which it is desired to add lithium nitrate. For economic reasons this point will be a concentration of more than about 35% by weight nitric acid, preferably more than about 50% and desirably more than about 65%.

Water is removed from the top of the still through line 2'. The more concentrated nitric acid-water solution obtained from weak acid still 2 is removed from bottom 3 of still 2 through line 4. Joining line 4 at point 5 is line 6, which introduces molten lithium nitrate into the $$HNO_3 - H_2O$$

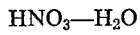

solution being carried through line 4. The lithium nitrate dissolves in the solution and the resulting lithium nitrate-containing solution is introduced at 7 into a concentrated acid still 8. Concentrated nitric acid (for example, 95% by weight nitric acid) is removed as product from the top of concentrated acid still 8 through line 9. Weak aqueous nitric acid solution containing dissolved lithium nitrate therein is removed from the bottom 10 of concentrated acid still 8 through line 11. Line 11 carries this latter solution to a flash evaporator 12 comprising a pool 13 of molten lithium nitrate. When the weak aqueous nitric acid solution containing lithium nitrate dissolved therein emerges from line 11 into flash evaporator 12, the weak aqueous nitric acid is flashed off through line 14 which joins feed line 1 at point 15, thus adding to the weak acid feed recycled weak acid from the bottom of concentrated acid still 8. The lithium nitrate removed in flash evaporator 12 merges with the molten pool 13 of lithium nitrate and is thus recovered.

When my entire process is understood by one skilled in the art, it will be obvious that concentrating the product in still 2 to 68% by weight nitric acid would give the maximum percentage of strong nitric acid as product from still 8 and a minimum recycle of weak nitric acid from flash evaporator 12, thus resulting in desirable fuel economies. However, in practice, it has been found to be more economical to operate the weak acid still 2 so as to yield a product of less than 68% by weight nitric acid. Therefore in normal operation of my process, these economies are balanced and product from weak acid still 2 is withdrawn, for example, at about 65% nitric acid by weight.

Figure 2:
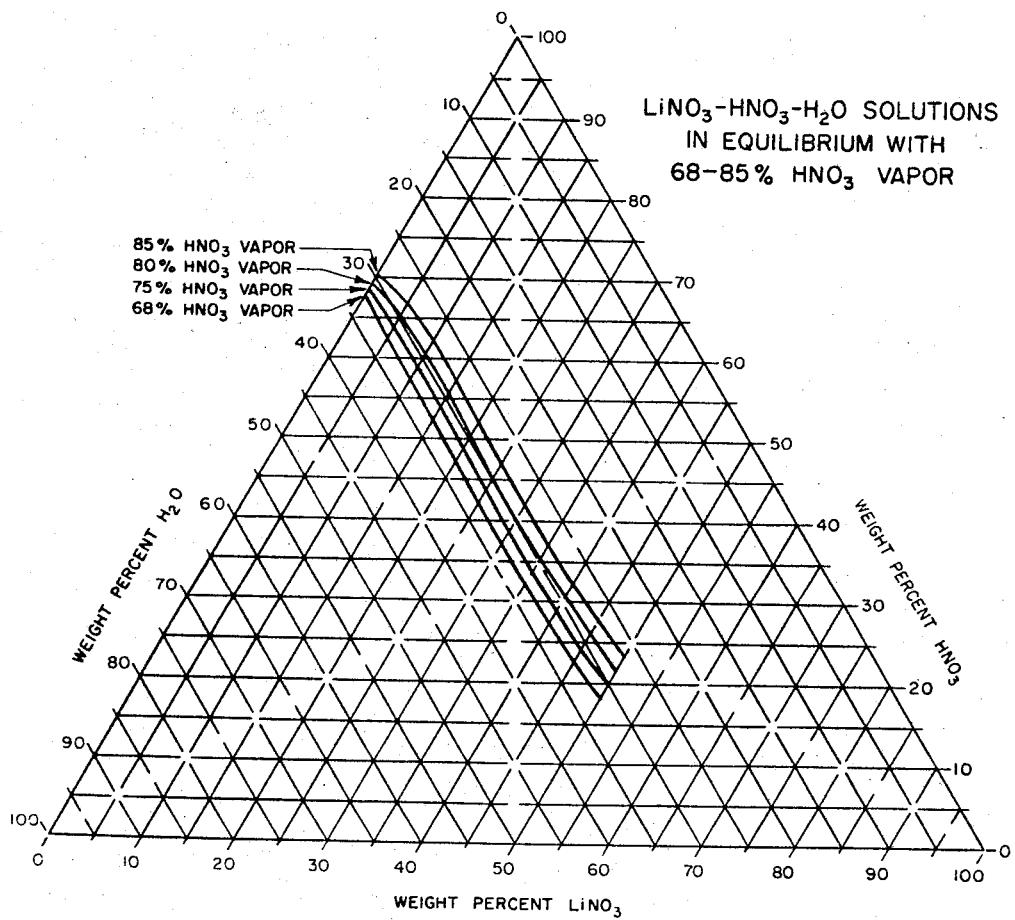
FIGURE 2 of the drawings is an equilibrium diagram for $LiNO_3$—$HNO_3$—$H_2O$ solutions in equilibrium with nitric acid vapor.
Figure 3:
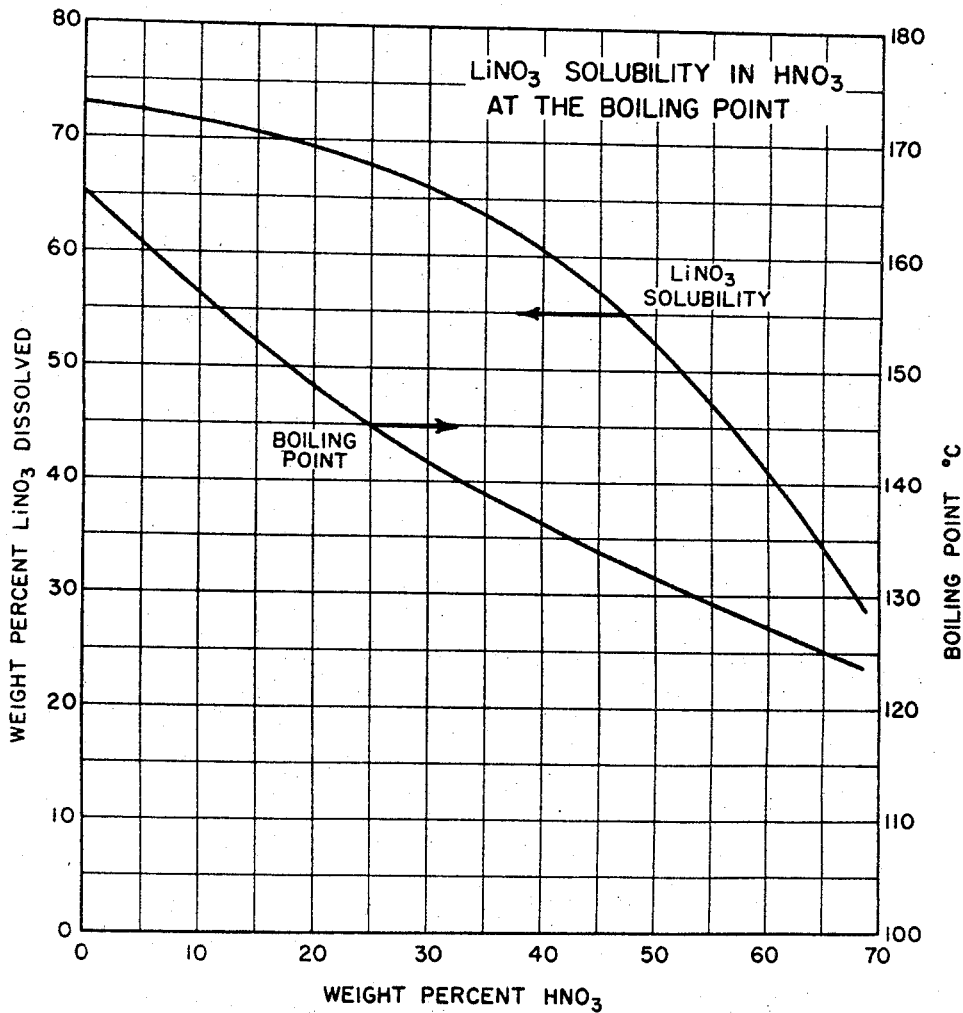
FIGURE 3 of the drawings shows a solubility curve for lithium nitrate dissolved in various aqueous solutions of nitric acid at the boiling point and also shows a boiling point curve giving the boiling point of these saturated solutions.

Referring more particularly to FIGURE 2, which gives nitric acid-water vapor compositions in equilibrium with a boiling liquid phase containing lithium nitrate, nitric acid, and water, it will again be obvious to one skilled in the art that dissolving increasing amounts of lithium nitrate in the product acid from still 2 will result in increasingly stronger nitric acid vapor in equilibrium, again resulting in lower recycle of weak nitric acid from the flash evaporator 12. There is a practical limit, however, to the amount of lithium nitrate that can be added to the nitric acid feeding into still 8. For practical reasons, it is desirable that the lithium nitrate be wholly in solution. Therefore, an amount of lithium nitrate is used that will be under the solubility limits in both the feed to still 8 and the bottoms discharge of still 8. The solubility limits can be determined from FIGURE 3 which depicts the solubility of lithium nitrate in various strengths of nitric acid at the boiling point and also the boiling point of these saturated solutions.

Another important aspect of my process is that still 8 is operated in such a manner that by proper adjustment of heat imput to the reboiler, reflux ratio, and rate of feed, the bottoms take off containing the lithium nitrate in solution in weak aqueous nitric acid is of such a composition that the vapor in equilibrium with these bottoms is at least 68% by weight nitric acid. In following the vapor composition from bottom to top of still 8, vapor just above the reboiler is at least 68% nitric acid by weight, and increases in strength upwards so that at the feed point the vapor composition is far in excess of 68% by weight nitric acid, and near the top of the still can be made to approach 100% nitric acid by rectification.

The molten pool of lithium nitrate can be maintained at any temperature above the melting point of lithium nitrate and below the decomposition temperature of nitric acid. For obvious reasons of heat economics it is normally desirable to keep the temperature of the molten pool as close to the melting point of lithium nitrate as possible. The preferred operating temperature of the pool is about 270° C., the melting point of lithium nitrate being about 261° C.

Although it will be apparent that the process of my invention could be carried out under sub- and super-atmospheric pressure conditions, atmospheric presssure is preferred.

The term dehydration has been used in the foregoing portions of the specification. It is believed that dehydration is accomplished by lithium nitrate not by hydrate formation, as with the magnesium nitrate of the prior art processes, but rather by hydration of the lithium ion itself when in solution. This theory is reinforced by the fact that lithium nitrate trihydrate loses all of its water at 61° C., yet the dehydrating effect of lithium nitrate is observed in this process at temperatures of about 135° C., for example.

It is obvious from the foregoing that a wide range of weak nitric acid strengths and a wide range of lithium nitrate concentrations can be used in the practice of my invention. The operating conditions indicated in the foregoing discussion are directed to the most economical operation of my invention, and are not to be construed as limiting in scope.

The following example is illustrative of the operation of my novel process.

EXAMPLE

A feed solution of 1900 pounds/hr. of nitric acid dissolved in 1900 pounds/hr. of water is introduced through line 1. At point 15, through line 14, 970 pounds/hr. of nitric acid dissolved in 1250 pounds/hr. of water is added to the weak acid feed solution of line 1 to form a weak acid feed solution entering the weak acid still consisting of 2870 pounds/hr. of nitric acid dissolved in 3150 pounds/hr. of water. In the weak acid still 1800 pounds/ hr. of water is removed from the top of the still through line 2'. 2870 pounds/hr. of nitric acid dissolved in 1350 pound/hr. of water is removed from the bottom 3 of weak acid still 2 through line 4. At point 5 in line 4, 1688 pounds/hr. of molten lithium nitrate from line 6 is added to line 4. Thus 2870 pounds/hr. of nitric acid, 1350 pounds/hr. of water and 1688 pounds/hr. of lithium nitrate are introduced into concentrated acid still 8 through line 4. 1900 pounds/hr. of nitric acid containing 100 pounds/hr. of water is removed as product from the top of concentrated acid still 8 through line 9. 970 pounds/hr. of nitric acid, 1250 pounds/hr. of water and 1688 pounds/hr. of lithium nitrate are removed from the bottom 10 of concentrated acid still 8 through line 11 and fed into flash evaporator 12. 970 pounds/hr. of nitric acid and 1250 pounds/hr. of water are flashed off from flash evaporator 12 through line 14 and 1688 pounds/hr. of lithium nitrate are recovered in pool 13.

The distillation temperatures of the above example are:

| | Deg. C. (about) |
|---|---|
| At the top of still 2 | 100 |
| At the bottom of still 2 | 121 |
| At the top still 8 | 86°–88 |
| At the bottom of still 8 | 150 |

However, these temperatures are merely exemplary and it will be obvious to those skilled in the art that some of these temperatures may vary when solutions of differents compositions are used. The determination of the amount of such variation and consequent adjustments of distilling conditions and procedures will be within the skill of those skilled in the art.

While the invention has been described with particular reference to specific embodiments, it is to be understood that it is not to be limited thereto but is to be construed broadly and restricted solely by the scope of the appended claims.

I claim:
1. A process for the concentration of weak aqueous nitric acid solution comprising the steps of:
    (a) feeding weak aqueous nitric acid to a still,
    (b) concentrating weak aqueous nitric acid solution until it contains at least about 35% by weight nitric acid,
    (c) dissolving molten lithium nitrate in the resulting acid solution,
    (d) distilling the aqueous lithium nitrate-nitric acid solution to obtain concentrated nitric acid containing more than about 68% by weight nitric acid as distillate and weak aqueous nitric acid-lithium nitrate solution as residue,
    (e) flash evaporating the weak aqueous nitric acid-lithium nitrate residue solution on a pool of molten lithium nitrate to flash off weak aqueous nitric acid and recover lithium nitrate.

2. The process of claim 1 wherein the weak aqueous nitric acid solution of step (a) is concentrated until it contains at least about 50% by weight nitric acid.

3. The process of claim 1 wherein at least part of the weak aqueous nitric acid flashed off from the pool of molten lithium nitrate is recycled to concentration step (a).

4. The process of claim 1 wherein a portion of the pool of molten lithium nitrate is recycled for use as at least part of the molten lithium nitrate of step (b).

5. In a process for concentrating nitric acid by distilling a solution of aqueous nitric acid containing at least about 35% by weight nitric acid, said solution containing lithium nitrate dissolved therein, the improvements comprising:
    (a) recovering lithium nitrate and weak aqueous nitric acid from still residue solution by contacting a pool of molten lithium nitrate with said residue solution under reduced pressure,
    (b) recycling at least part of said pool of molten lithium nitrate and dissolving it in feed aqueous nitric acid solution for subsequent distillation, and removing the weak nitric acid as an overhead vapor from said pool.

6. The process of claim 5 wherein the solution of aqueous nitric acid to be distilled contains at least about 50% by weight nitric acid.

References Cited

UNITED STATES PATENTS

| Re. 25,393 | 6/1963 | Bechtel | 23—160 X |
| 2,463,453 | 3/1949 | Beardsley. | |
| 3,106,515 | 10/1963 | Williams | 203—13 |
| 3,211,525 | 10/1965 | Smith et al. | 203—13 X |

FOREIGN PATENTS

| 165,681 | 8/1964 | U.S.S.R. |
| 137,834 | 2/1921 | Great Britain. |

NORMAN YUDKOFF, *Primary Examiner.*

J. SOFER, *Assistant Examiner.*

U.S. Cl. X.R.

23—160; 159—47; 203—33